(12) United States Patent  (10) Patent No.: US 6,684,458 B1
Sargant                          (45) Date of Patent:  Feb. 3, 2004

(54) HANDLE FOR VESSEL

(76) Inventor: Adrian P. Sargant, VOR Transmissions Limited Little London House St., Anne's Road, Little London, Willenhall WV13 1DT (GB)

( * ) Notice: Subject to any disclaimer, the term of this patent is extended or adjusted under 35 U.S.C. 154(b) by 35 days.

(21) Appl. No.: 10/009,965

(22) PCT Filed: Jun. 9, 2000

(86) PCT No.: PCT/GB00/02262

§ 371 (c)(1),
(2), (4) Date: Dec. 14, 2001

(87) PCT Pub. No.: WO00/76870

PCT Pub. Date: Dec. 21, 2000

(30) Foreign Application Priority Data

Jun. 16, 1999 (GB) .............................. 9913867

(51) Int. Cl.[7] .............................................. A47J 45/00
(52) U.S. Cl. ......................... 16/430; 16/425; 706/217; 706/218
(58) Field of Search ............... 16/430, 111.1, 16/422, 425; 206/217, 218, 431

(56) References Cited

U.S. PATENT DOCUMENTS

| 2,654,628 | A | * | 10/1953 | Klante | 294/137 |
|---|---|---|---|---|---|
| 3,271,856 | A | * | 9/1966 | Rowley | 30/343 |
| 3,822,020 | A | * | 7/1974 | Hong | 210/248 |
| D292,663 | S | * | 11/1987 | Johnson | D7/691 |
| 4,850,479 | A | * | 7/1989 | Bird | 206/150 |
| 5,219,419 | A |   | 6/1993 | Prothe |  |
| 5,624,052 | A | * | 4/1997 | Caldi | 220/575 |
| D408,217 | S | * | 4/1999 | LoGiudice | D7/401.2 |
| D450,605 | S | * | 11/2001 | Wright |  |
| 6,520,366 | B1 | * | 2/2003 | Bradley et al. | 220/23.2 |

FOREIGN PATENT DOCUMENTS

| DE | 2 123 663 | 11/1972 |
|---|---|---|
| DE | 43 02 172 A1 | 7/1994 |
| EP | 0 474 980 | 3/1992 |

* cited by examiner

*Primary Examiner*—Gary Estremsky
*Assistant Examiner*—Mark Williams
(74) *Attorney, Agent, or Firm*—Richard C. Litman

(57) ABSTRACT

A handle (11) for a vessel (9) is described which has an elongate grip portion (12) and at least one extension (13) therefrom for attachment of the handle (11) to the vessel (9). The elongate grip portion (12) has running along its length and facing away from the extension(s) on one side a convex surface (15) and the other side a concave surface (16). Preferably the concave and concave surfaces (15, 16) are matched in cross-section.

8 Claims, 3 Drawing Sheets

HANDLE FOR VESSEL

DESCRIPTION OF INVENTION

The invention relates to a new shape of handle for vessels and in particular, although not exclusively, to handles for drinking vessels.

Drinking vessel handles as found on such items as coffee mugs, beer; glasses or other similar vessels, although adequate for the purpose, do not lend themselves to the common practice of two or more vessels being carried in one hand at the same time. Owing to the prior art design of the handles of such vessels and the sloping or irregular shapes of the sides of the vessels, holding two or more in one hand when they are full, although possible, does present a problem in securely gripping them in a manner which avoids spillage of the contents. Clearly when the contents are hot such as tea or coffee, there are safety implications in carrying the vessels safely as spillage may lead to scalding.

It is a first object of the invention to provide a new form of handle for vessels which mitigates the above described problems.

According to a first aspect of the invention there is provided a handle for a vessel having an elongate grip portion and at least one extension therefrom for attachment of the handle to the vessel, wherein the elongate grip portion has running along its length and facing away from the extension(s) on one side a convex surface and the other side a concave surface.

Preferably the convex surface and the concave surface are matched in cross section.

Conveniently the elongate grip portion is substantially straight.

The handle may further include two small protuberances on and spaced apart along the length of the concave surface.

According to a second aspect of the invention there is provided a vessel having a body and attached thereto a handle according to the first aspect of the invention.

The vessel may be a drinking vessel.

The body of the vessel may be circular in cross section and the body may be substantially cylindrical or barrel shaped.

Embodiments of the invention will now be described with reference to the accompanying drawings in which.

Figure 1:
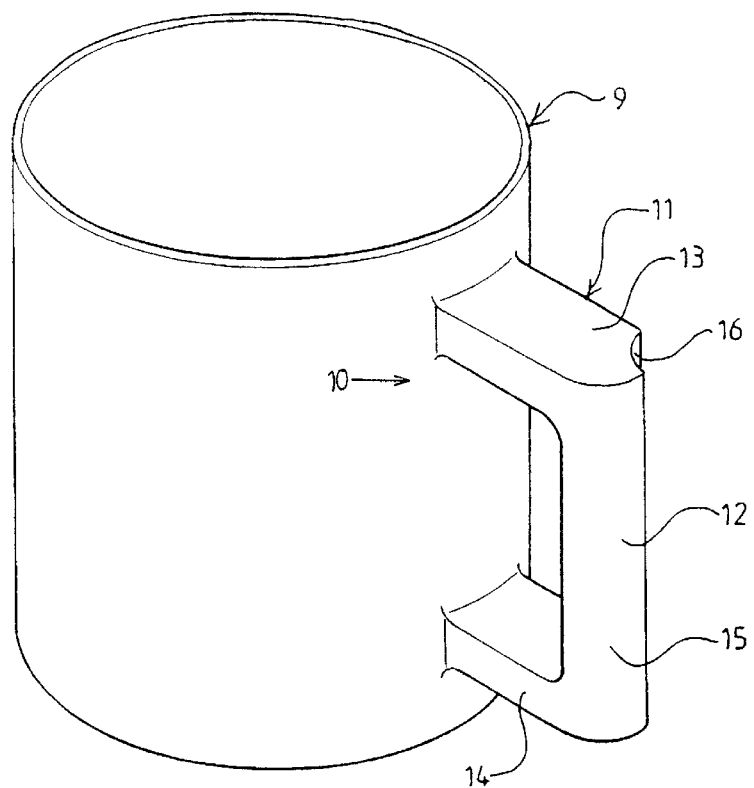
FIG. 1 is a perspective view of a drinking vessel incorporating a handle according to the first aspect of the invention.

Referring to the Figures a drinking vessel 9 includes a body 10 and handle 11. In this example the body 10 is substantially cylindrical. The handle 11 has an elongate grip portion 12 and two extensions 13, 14, substantially perpendicular to the grip portion 12 and, by means of which, it is attached to the drinking vessel 9. The elongate grip portion 12 is shaped in a new way and has running along its length and facing away from the extensions 13, 14, a convex surface 15 and a concave surface 16. The convex and concave surfaces 15, 16, are matched in cross section as will become clearer below.

Figure 2:
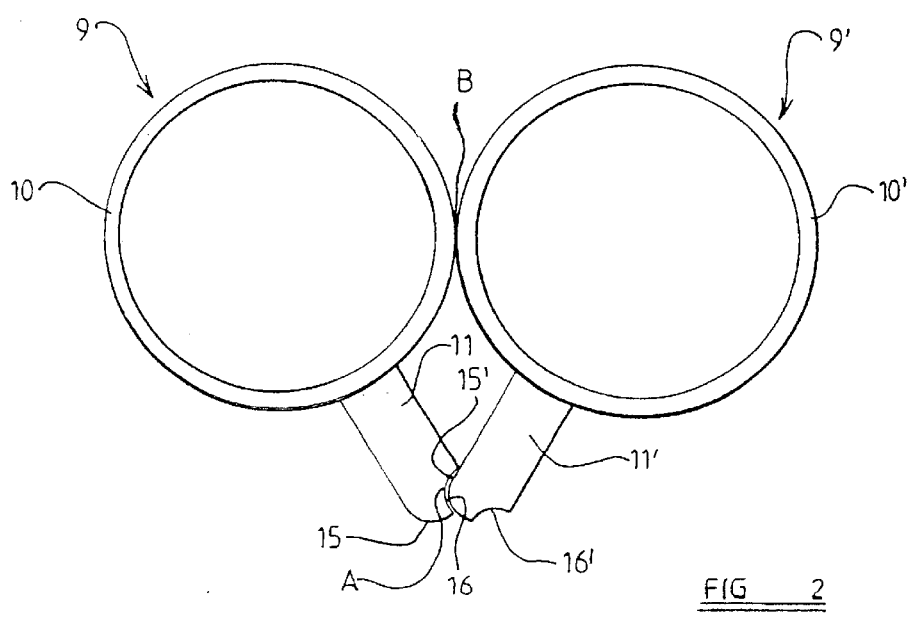
FIG. 2 is a plan view of two drinking vessels of FIG. 1 showing their handles engaged for carrying.
Figure 3:
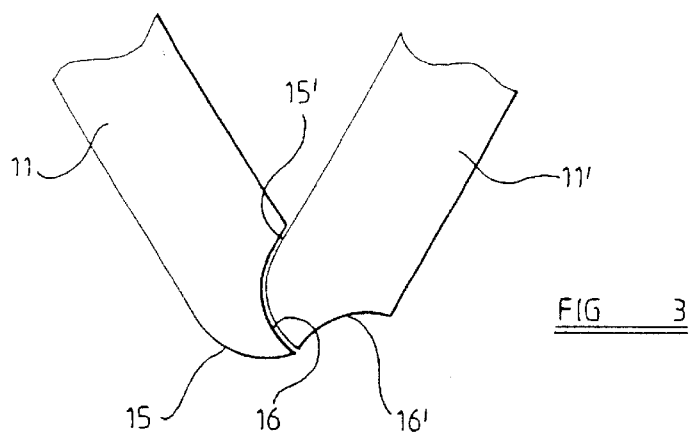
FIG. 3 is an enlarged view of the two handles of FIG. 2 engaged.

Referring in particular to FIGS. 2 and 3, two drinking vessels 9, 9' located adjacent to each other with their handles 11, 11' engaged with each other. To be more specific the convex surface 15' of the right hand drinking vessel 9' is engaged in the concave surface 16 of the left hand drinking vessel 9. In these relative positions there are two areas of contact between the two drinking vessels 9, 9'. The first, referenced A, is provided by the engaged convex and concave surfaces 15', 16, and extends the length of the handles 11, 11', and is substantially of the width of the convex surface 16. The second, referenced B, is provided by the two bodies 10, 10' and extends the length of the bodies 10, 10', but is of negligible width.

Figure 4:
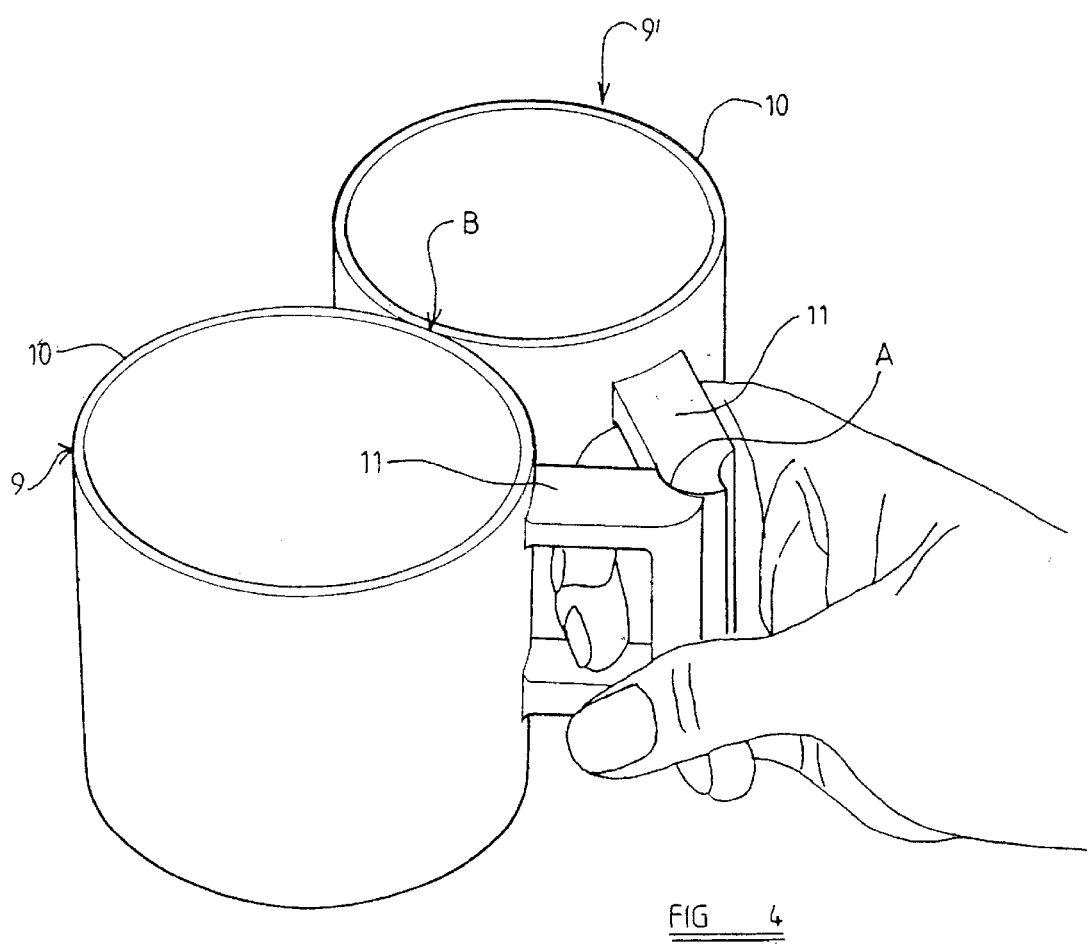
FIG. 4 is a perspective view of the two drinking vessels of FIG. 2 being carried in one hand.

When in these relative positions the two drinking vessels 9, 9' can readily be picked up in one hand, as shown in FIG. 4, and are stable such that there is a greatly reduced risk of one or both drinking vessels shifting relative to each other and leading to spillage. Additional drinking vessels 9 can also be added to the two shown in FIG. 4, with their handles 11 similarly engaged, for lifting together. The limit on the number of drinking vessels 9 which can be carried simultaneously in this way is determined by the size of the vessels concerned and of the hand to carry them rather than other considerations such as stability, as in the prior art.

Figure 5:
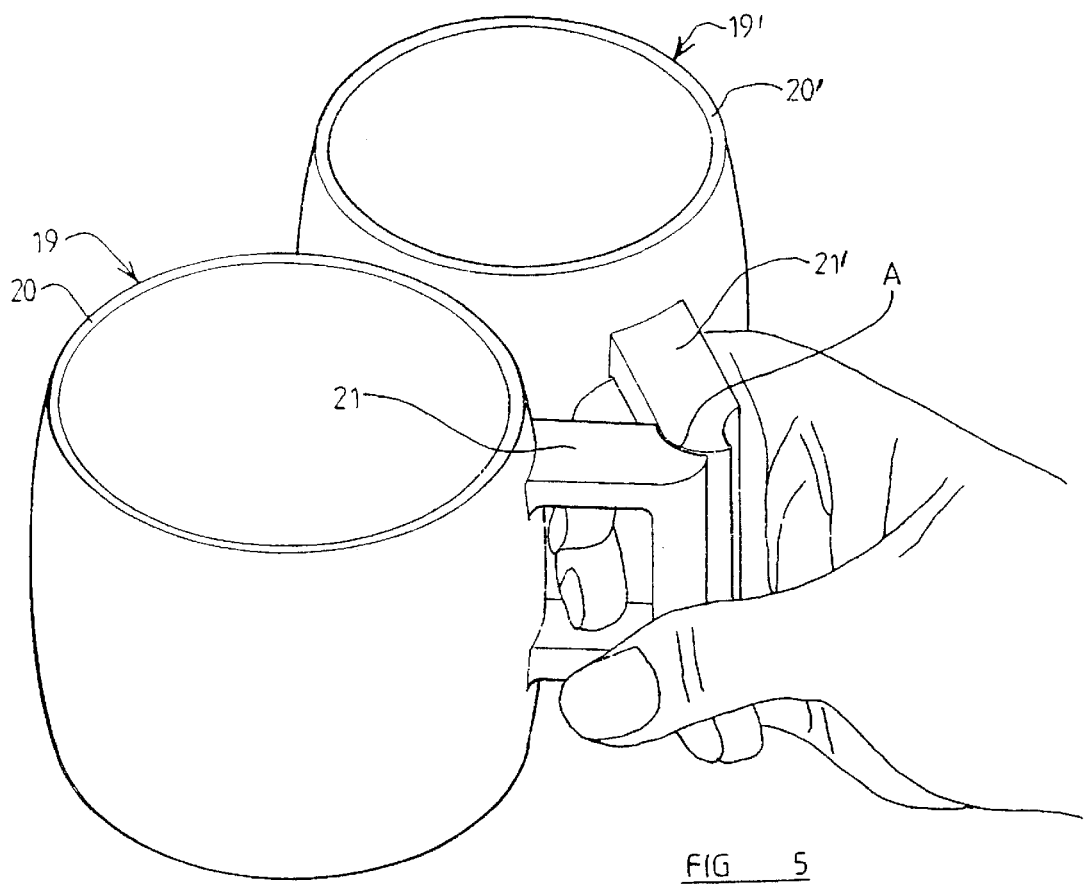
FIG. 5 is a perspective view of two differently shaped drinking vessels incorporating handles of FIG. 1, being carried in one hand.

The drinking vessel 9 is shown with a substantially cylindrical body 10, however, the invention is equally applicable to vessels with other body shapes. For example, FIG. 5 shows two drinking vessels 19, 19' having bodies 20, 20' which are barrel shaped, that is, which are wider in their mid portion and narrower at both top and bottom. The contact area A between their handles 21, 21' remains the same as for the first embodiment, whilst the contact area between the bodies 20, 20' is reduced from a line the length of the bodies to a point or shorter line. However, because of the contact area A, the drinking vessels 19, 19' are stable when carried simultaneously as shown in FIG. 5.

The handles described above are all illustrated with the convex surface on the left hand side and the concave surface on the right hand side, however, the surfaces may, of course, be reversed.

The handles according to the invention have been described in use of drinking vessels which may, for example, be mugs as used for tea and coffee, or beer glasses, as these are items where the use of such handles may provide the most advantage. However, handles according to the invention may be applied to other vessels such as jugs, salt and pepper pots, or the kind of handled holder provided for use with disposable plastic cups, particularly when containing hot drinks.

Handles according to the invention are not limited in any way by the material from which the handle and vessel are made, being equally applicable to ceramic, glass, metal and plastic vessels. When made of some materials it may be appropriate for the handle and body of the vessel to be made separately and subsequently joined together. This is often the case when using ceramics, when the handle and body may be made by different companies.

Figure 6:
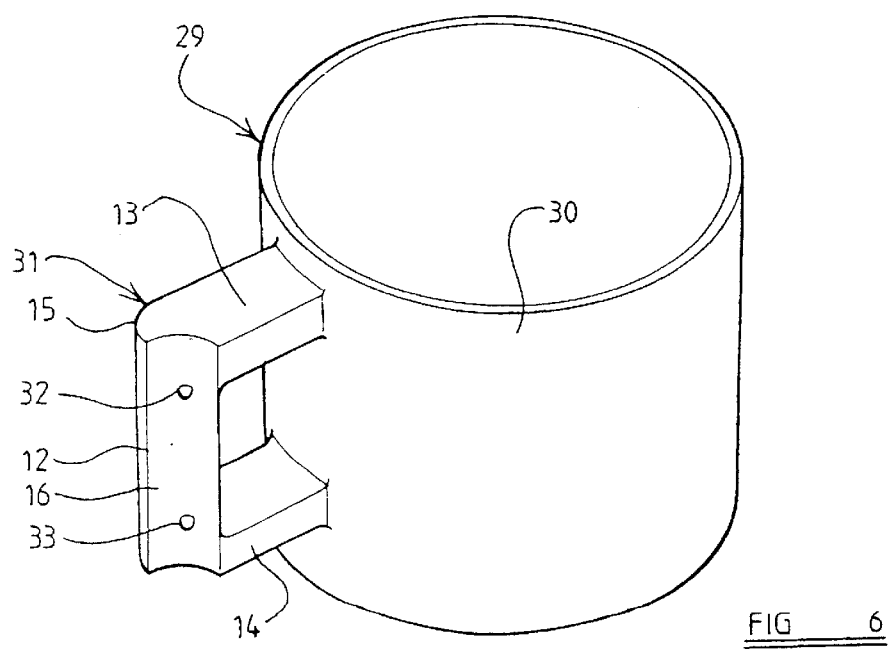
FIG. 6 is a perspective view of a second embodiment of a handle according to the first aspect of the invention.

There is a risk, particularly when using some materials and manufacturing regimes, for there to be some shrinkage or warping in the handle. FIG. 6 illustrates an alternative embodiment of handle which is intended to reduce the problems such occurrences may cause. A drinking vessel 29 has a body 30 and a handle 31. The handle has all the features of the handle 11 previously described and these are like referenced. In addition, the handle 31 includes two protuberances 32, 33 located in, and spaced apart along, the length of the concave surface 16.

The protuberances 32, 33 mean that even if two handles 31, 31' of two drinking vessels do not, as a result of shrinkage or warping during manufacture, have matched profiles to their concave and convex surfaces which are engaged for carrying, two spaced apart contact points will be provided within the general contact area A. Hence the drinking vessels will still be stable when picked up by one hand in the manner shown in FIG. 2.

The handles according to the invention provide the advantage that two or more vessels incorporating them can be picked up and carried much more safely than is the case with prior art vessels and handles. This is the case even if the vessels incorporating the handles according to the invention are not absolutely the same, as improved stability is provided even when the handles engaged with each other are not identical. The increased stability is also still provided if one vessel is higher than the other rather than, as illustrated, being aligned horizontally.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A handle for a drinking vessel comprising:
   an elongated grip portion having a length and two ends, the grip portion having at least a first side and a second side extending along the length thereof;
   the first side forming a convex surface, and the second side forming a concave surface;
   whereby, when disposed adjacent a similar handle, the convex surface of the grip portion can be engaged with a concave surface of a grip portion of the similar handle;
   at least one extension attached at one of the ends of the grip portion, the at least one extension being substantially perpendicular to the grip portion;
   wherein the grip portion is coupled to a vessel via the extension.

2. A handle according to claim 1, wherein the convex surface and concave surface being substantially matched in curvature.

3. A handle according to claims 1, further comprising at least two protuberances disposed within the concave side of the grip portion, the protuberances being spaced apart therein.

4. A handle according to claim 3, wherein the protuberances on the concave surface of the grip portion can be engaged with the convex side of the grip portion of the similar handle.

5. A drinking vessel for containing fluids comprising:
   a container having at least closed bottom, and a wall member defining an open top opposite the closed bottom;
   an elongated grip portion having a length and two ends, the grip portion having at least a first side and a second side extending along the length thereof;
   the first side forming a convex surface, and the second side forming a concave surface;
   whereby, when disposed adjacent a similar handle, the concave surface of the grip portion can be engaged with a convex surface of a grip portion of the similar handle; and
   at least one extension attached at one of the ends of the grip portion, the at least one extension being substantially perpendicular to the grip portion, and the at least one extension attaching the grip portion to the wall member of the container;
   wherein the at least one extension and the grip portion define a plane.

6. A drinking vessel according to claim 5, wherein the convex surface and concave surface being substantially matched in curvature.

7. A drinking vessel according to claim 5, further comprising at least two protuberances disposed within the concave side of the grip portion, the protuberances being spaced apart therein.

8. A drinking vessel according to claim 7, wherein the convex side of the grip portion can be engaged with the protuberances on the concave surface of the grip portion of the similar drinking vessel.

* * * * *